(12) United States Patent
Trunek (10) Patent No.: US 8,555,682 B2
(45) Date of Patent: Oct. 15, 2013

(54) LINKAGE LOCK

(76) Inventor: Christopher Trunek, Auburn Township, OH (US)

( * ) Notice: Subject to any disclaimer, the term of this patent is extended or adjusted under 35 U.S.C. 154(b) by 77 days.

(21) Appl. No.: 13/046,222

(22) Filed: Mar. 11, 2011

(65) Prior Publication Data

US 2011/0219829 A1 Sep. 15, 2011

Related U.S. Application Data

(60) Provisional application No. 61/313,675, filed on Mar. 12, 2010.

(51) Int. Cl.
*E05B 69/00* (2006.01)

(52) U.S. Cl.
USPC .............. 70/58; 70/14; 70/18; 70/30; 70/49; 70/233

(58) Field of Classification Search
USPC ................. 70/14, 18, 19, 30, 49, 57, 58, 233
See application file for complete search history.

(56) References Cited

U.S. PATENT DOCUMENTS

| | | | | |
|---|---|---|---|---|
| 2,451,100 A * | 10/1948 | Lecompte | | 242/377 |
| 2,655,806 A * | 10/1953 | Stiler | | 70/57 |
| 3,747,379 A | 7/1973 | White | | |
| 3,748,876 A | 7/1973 | Mathews | | |
| 3,908,414 A * | 9/1975 | Thorne | | 70/18 |
| 3,930,389 A * | 1/1976 | Buikus | | 70/164 |
| 3,959,995 A * | 6/1976 | Fletcher | | 70/18 |
| 4,760,718 A * | 8/1988 | Muramatsu et al. | | 70/18 |
| 4,870,843 A * | 10/1989 | Lundberg | | 70/233 |
| 4,986,095 A * | 1/1991 | Chou et al. | | 70/10 |
| 5,018,374 A | 5/1991 | Montano | | |
| D347,988 S * | 6/1994 | Thorne | | D8/333 |
| D349,031 S * | 7/1994 | Smith | | D8/333 |
| 5,325,689 A | 7/1994 | Warner | | |
| 5,475,993 A * | 12/1995 | Kuo | | 70/18 |
| 5,487,285 A | 1/1996 | Leichel | | |
| 5,513,508 A * | 5/1996 | Saunders et al. | | 70/233 |
| 5,678,435 A * | 10/1997 | Hodson | | 70/233 |
| 5,732,577 A * | 3/1998 | Okada et al. | | 70/18 |
| 5,832,753 A * | 11/1998 | Nielsen | | 70/38 A |
| 5,913,906 A * | 6/1999 | Strocchi | | 70/18 |
| 5,987,936 A * | 11/1999 | Hartman, Jr. | | 70/2 |
| 6,012,739 A * | 1/2000 | Weiss et al. | | 280/814 |
| 6,044,669 A * | 4/2000 | Levi | | 70/18 |
| 6,125,669 A * | 10/2000 | McDaid et al. | | 70/58 |
| 6,427,499 B1 * | 8/2002 | Derman | | 70/58 |
| 6,820,448 B1 * | 11/2004 | Hsieh | | 70/18 |
| 6,862,906 B2 * | 3/2005 | Lindkjølen | | 70/58 |
| 7,437,898 B2 * | 10/2008 | Su | | 70/14 |
| 7,481,084 B1 * | 1/2009 | Wu | | 70/18 |
| 7,503,194 B2 * | 3/2009 | McNeil | | 70/2 |
| 7,581,787 B2 * | 9/2009 | Livne | | 297/215.13 |
| 7,624,605 B2 * | 12/2009 | Vitali | | 70/233 |
| 7,712,339 B2 * | 5/2010 | Hentschel et al. | | 70/30 |

* cited by examiner

*Primary Examiner* — Suzanne Barrett
(74) *Attorney, Agent, or Firm* — Thomas Y. Kendrick; Benjamen E. Kern; Benesch, Friedlander, Coplan & Aronoff, LLC (57) ABSTRACT

A linkage lock includes at least a plurality of elongated links capable of being arranged in a substantially tubular configuration; wherein each link has a longitudinal axis extending therethrough and at least one pivot disposed at the ends thereof configured to allow rotation about an axis in substantially orthogonal relation to the longitudinal axis; wherein at least one link is configured to be separable from the remainder of the linkage lock.

20 Claims, 15 Drawing Sheets

LINKAGE LOCK

CLAIM OF PRIORITY

This filing claims priority to Provisional Patent Application No. 61/313,675 filed Mar. 12, 2010, which is incorporated by reference herein in its entirety.

FIELD

The present disclosure relates generally to linkage locks and, more particularly, at least to a lock for transporting with bicycles and securing bicycles to an stationary object.

BACKGROUND

Locking devices may be used to secure a bicycle or other mobile object to a stationary object to prevent theft.

U or shackle locks typically consist of a U-shaped steel shackle that is removably coupled to a receiving lock cylinder.

Cable locks are another common device used to secure bicycles and other mobile objects to stationary objects. Cable locks are available in a variety of lengths and diameters that can easily secure multiple components around objects of varied size. Cable locks have innate portability as they can be wrapped around almost any frame member and be attached to a bicycle with a bracket or clip.

Another common locking device used to secure bicycles and other mobile devices to a stationary object is a chain lock, which uses hardened steel links connected by a high strength lock.

SUMMARY

A linkage lock is disclosed which according to certain embodiments may be used to fix a bicycle or other object such as a motorcycle, scooter, outdoor furniture, etc. to a stationary and immovable object such as a bicycle rack, sign pole, or tree to prevent theft or other unintended removal.

According to one embodiment of the present disclosure, a linkage lock includes at least a plurality of elongated links capable of being arranged in a substantially tubular configuration; wherein each link has a longitudinal axis extending therethrough and at least one pivot disposed at the ends thereof configured to allow rotation about an axis in substantially orthogonal relation to the longitudinal axis; wherein at least one link is configured to be separable from the remainder of the linkage lock.

BRIEF DESCRIPTION OF THE FIGURES

In the figures, which are not necessarily drawn to scale, like numerals describe substantially similar components throughout the several views. Letters after numbers represent iterations of components substantially similar to others bearing that numeral. The drawings illustrate generally, by way of example, but not by way of limitation, various embodiments discussed in the claims of the present document.

DETAILED DESCRIPTION OF THE FIGURES

Within the scope of the present disclosure, the terms 'chiral' and 'chirality' shall have their ordinary meaning in the art, namely one which describes a relationship between two shapes which (1) each lack an internal plane of symmetry and (2) are non-superimposable mirror images of one another. Chiral shapes include for instance human hands.

Figure 1:
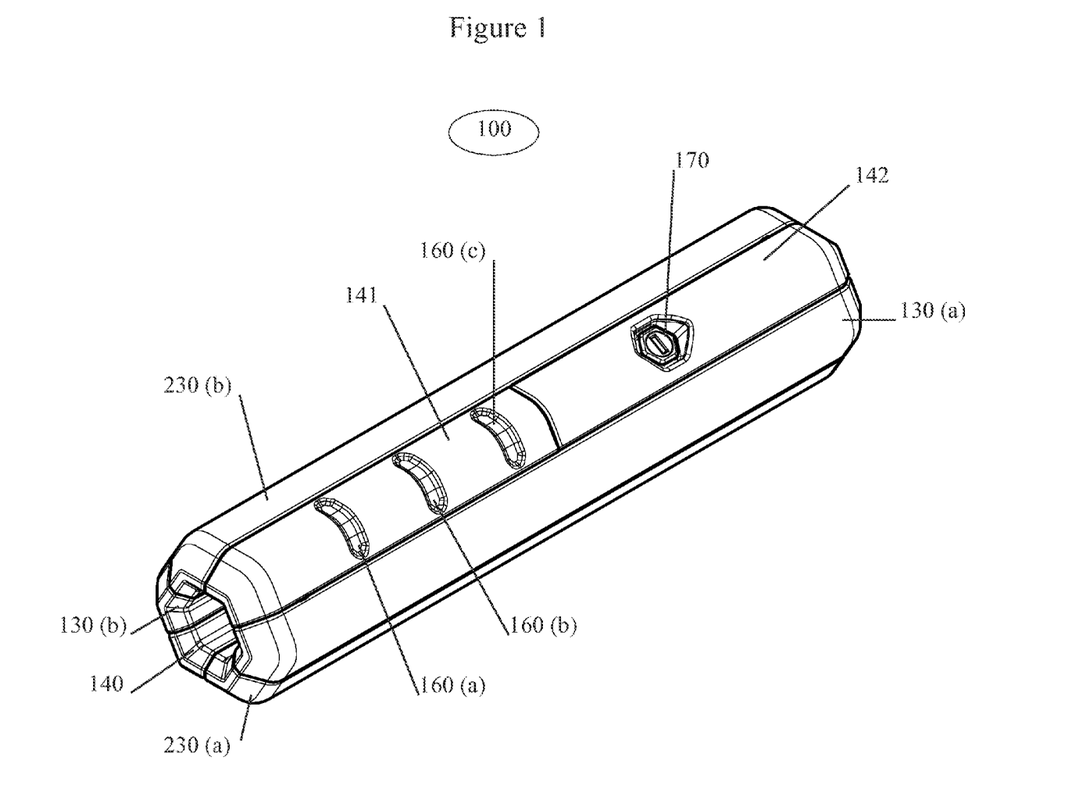
FIG. 1 shows a perspective view of an embodiment of the present disclosure in a first configuration.

With reference to FIG. 1, a linkage lock embodying features of the present disclosure is indicated generally by the numeral 100. Linkage lock 100 further includes at least a plurality of right-handed solid links 130(*a*, b), left-handed solid links 230(*a*, b), a right-handed separable link 140 and a left-handed separable link 240 pivotally coupled by rotational couplers 150(*a*–1) [not shown] capable of being arranged in a substantially tubular configuration as shown in FIG. 1.

Figure 2A:
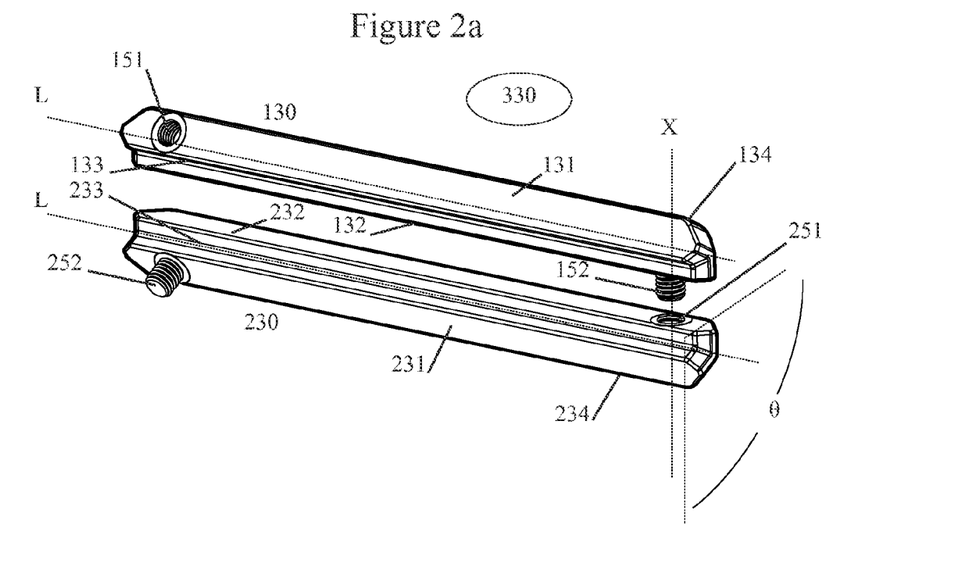
FIG. 2*a* shows a perspective view of two solid links which form an assembly according to the embodiment of the present disclosure shown in FIG. 1.

With reference to FIG. 2*a*, solid link assembly 330 includes a right-handed solid link 130 and a left-handed solid link 230 whose configuration and features are substantially chiral reflections of one another. Substantially chiral reflections of features disposed upon left-handed solid link 230 are represented by numerals 100 greater than their corresponding structures disposed upon right-handed solid link 130.

Right-handed link 130 is an elongated member composed of a rigid material including for instance plastic, wood, or metal. Right-handed solid link 130 has a first surface 131 and a second surface 132 having an angle θ therebetween and a longitudinal axis L extending therethrough. According to the embodiment shown in the figures, θ is 60 degrees. With continued reference to FIG. 2*a*, there is a female portion 151 of a rotational coupler 150(*a*–1) disposed upon surface 131 of a first end of solid link 130 and a male portion 152 of a rotational coupler 150(*a*–1) disposed upon surface 132 at an opposing second end of solid link 130. Further, there is a trough 133 disposed at an interior surface of θ, as well as an exterior curve 134 disposed at an exterior surface of θ.

According to certain embodiments of the present disclosure, trough 133 comprises a soft or non-marking surface including for instance a silicone, natural or synthetic rubber, foam, leather, fabric, a portion, or multiple portions thereof.

With continued reference to FIG. 2a, female portion 151 and male portion 152 have complementary threads disposed thereupon configured for pivotally coupling multiple right-handed solid links 130 and left-handed solid links 230 to one another. One of ordinary skill in the art will appreciate that the chiral relationship between right-handed link 130 and left-handed link 230 applies to the direction of the threads of their respective components as well. For instance, in embodiments where male portion 152 of a right-handed solid link 130 is right-hand threaded, corresponding male portion 252 of corresponding left-handed solid link 230 is left-hand threaded. Similarly, in embodiments where male portion 152 of right-handed solid link 130 is right-hand threaded, corresponding female portion 251 is also right-hand threaded.

According to further embodiments of the present disclosure not shown in the figures, respective female portions and a male portions of couplers may be joined by complimentary bayonet mounts, press-fittings, snap-fittings, rivets, adhesives disposed thereupon or other suitable pivotable coupling methods known in the mechanical arts.

With continued reference to FIG. 2a, there is a bearing 153 [not shown] disposed within male portion 152 configured to allow rotation of a coupler 150 and its respective link 130 or 140 about an axis X. According to further embodiments of the present disclosure not shown in the figures, there are bearings disposed within female portion 151, or both male portion 152 and female portion 151 configured to allow rotation about axis X. According to further embodiments of the present disclosure, there are detents along the rotational path of bearing 153.

Figure 2B:
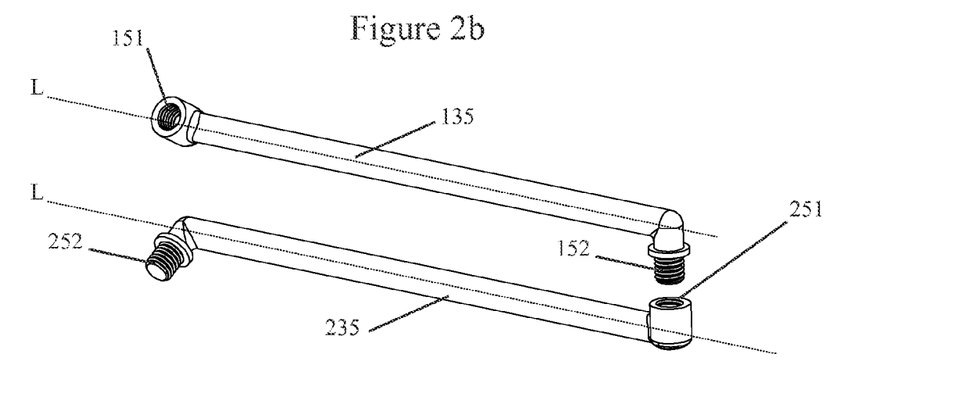
FIG. 2*b* shows a perspective view of two internal armatures of the solid links according to the embodiment of the present disclosure shown in FIG. 1.

With reference to FIG. 2b, right-handed rigid armature 135 and left-handed rigid armature 235 are shown. Rigid armatures 135 and 235 are substantially chiral reflections of one another. Substantially chiral reflections of features disposed upon right-handed rigid armature 235 are represented by numerals 100 greater than their corresponding structures disposed upon left-handed rigid armature 135.

According to certain embodiments of the present disclosure, there is an elongated right-handed armature 135 disposed within solid link 130 which provides operative support for male portion 152 and female portion 151. According to the embodiment of the present disclosure shown in the figures, armature 135 is composed of metal including for instance an alloy of steel, an alloy of aluminum, or other suitable metal known in the art.

Figure 3:
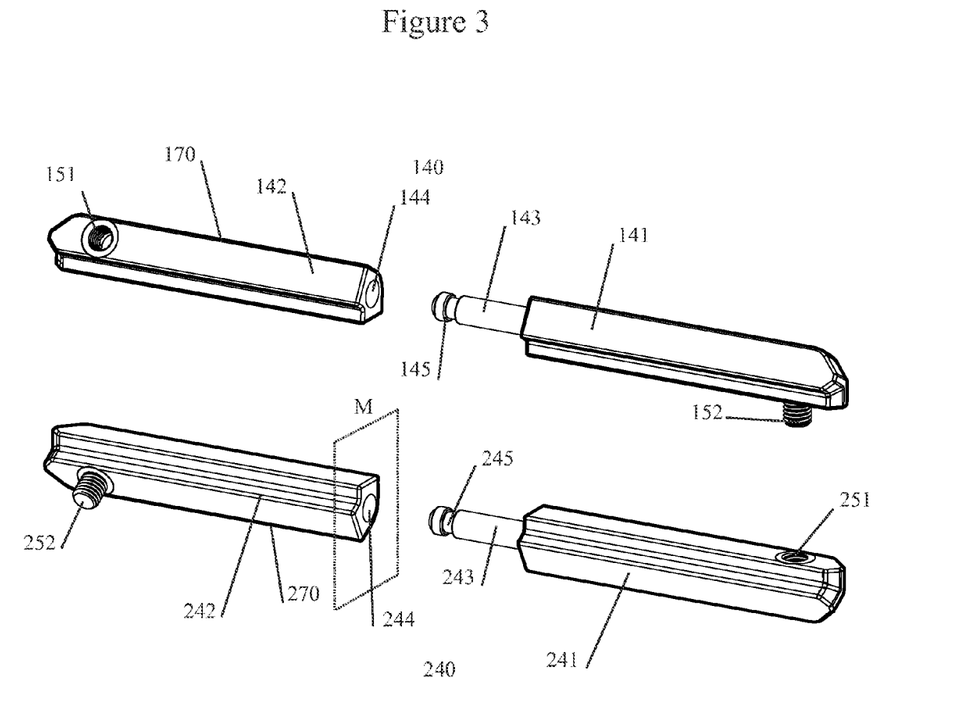
FIG. 3 shows a perspective view of two separable links according to the embodiment of the present disclosure shown in FIG. 1.

With reference to FIG. 3, a right-handed separable link 140 and left-handed separable link 240 are shown. Right-handed separable link 140 and left-handed separable link 240 are substantially chiral reflections of one another. Substantially chiral reflections of features disposed upon right-handed separable link 240 are represented by numerals 100 greater than their corresponding structures disposed upon left-handed separable link 140.

According to the embodiment of the present disclosure shown in FIG. 3, separable link 140 includes all of the features of a solid link 130 which has been separated along a medial plane M defining male link portion 141 and female link portion 142. There is a pin 143 extending from male link portion 141 in substantially parallel relation to axis L configured to be removably retained within a complementary recess 144 extending into female link portion 142 in substantially parallel relation to axis L. There is a retention groove 145 disposed upon the circumference of pin 143 configured to be received and retained within a complimentary locking mechanism [not shown] disposed within corresponding recess 144. The locking mechanism is configured to temporarily retain pin 143 therewithin according to suitable locking methods known in the art including for instance a pin, a bar, a lever, or clasp configured to act upon retention groove 145 or a similar structure and thereby temporarily fix pin 143 within recess 144. According to certain embodiments of the present disclosure, there is a detent disposed within recess 144 comprising a spring-loaded lever or other suitable structure known in the art which temporarily retains retention groove 145 thereagainst and provides tactile as well as acoustic feedback to an operator thereof.

With continued reference to FIGS. 3 and 1, there is a keyed tumbler 170 disposed within female link portion 142 of a separable link 140. Keyed tumbler 170 is a keyed locking mechanism configured to engage or disengage the locking mechanism against retention groove 145 in order to securely and temporarily retain pin 143 within recess 144. According to certain embodiments of the present disclosure, keyed tumbler 170 is identical to keyed tumbler 270.

According to further embodiments of the present disclosure, including for instance those shown in FIG. 1, there are grip portions 160(a-c) disposed upon right-handed separable link 130 configured for an operator to grasp the links with said operator's hands. Grip portions 160(a-c) may be composed of the same material and surface finish as the remainder of right-handed separable link 130, of the same material as right-handed separable link 130 but having a modified surface finish configured to increase the frictional coefficient between grip portions 160(a-c) and the hands of an operator (including for instance raised or indented portions), or of different material than that of right-handed separable link 130 (such as those with lower durometers and/or increased frictional coefficients, for instance, silicones, and natural or synthetic rubbers).

With returning reference to FIG. 1, a first 'folded' configuration of an embodiment of the present disclosure is shown wherein alternating right-handed solid links 140 and left-handed solid links 240 are coupled to one another as well as to right-handed separable link 140 and left-handed separable link 240 by joining respective complementary male portions 152 and female portions 251 or male portions 252 and female portions 151 of the links together. In such a 'folded' configuration the joined links approximate an tubular member where respective troughs 133 and troughs 233 define an interior surface of a tube and respective exterior curves 134 and curves 234 define an exterior surface of a tube.

Figure 4:
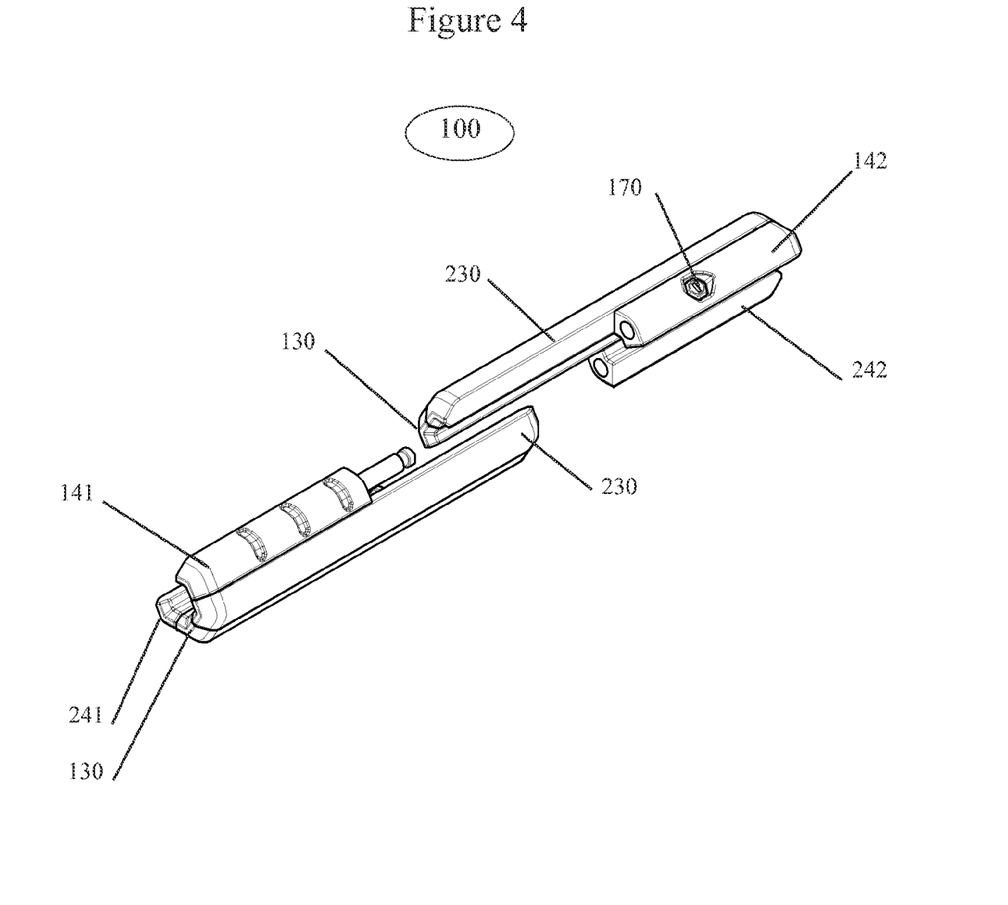
FIG. 4 shows a perspective view of the embodiment of the present disclosure of FIG. 1 in a second configuration.
Figure 5:
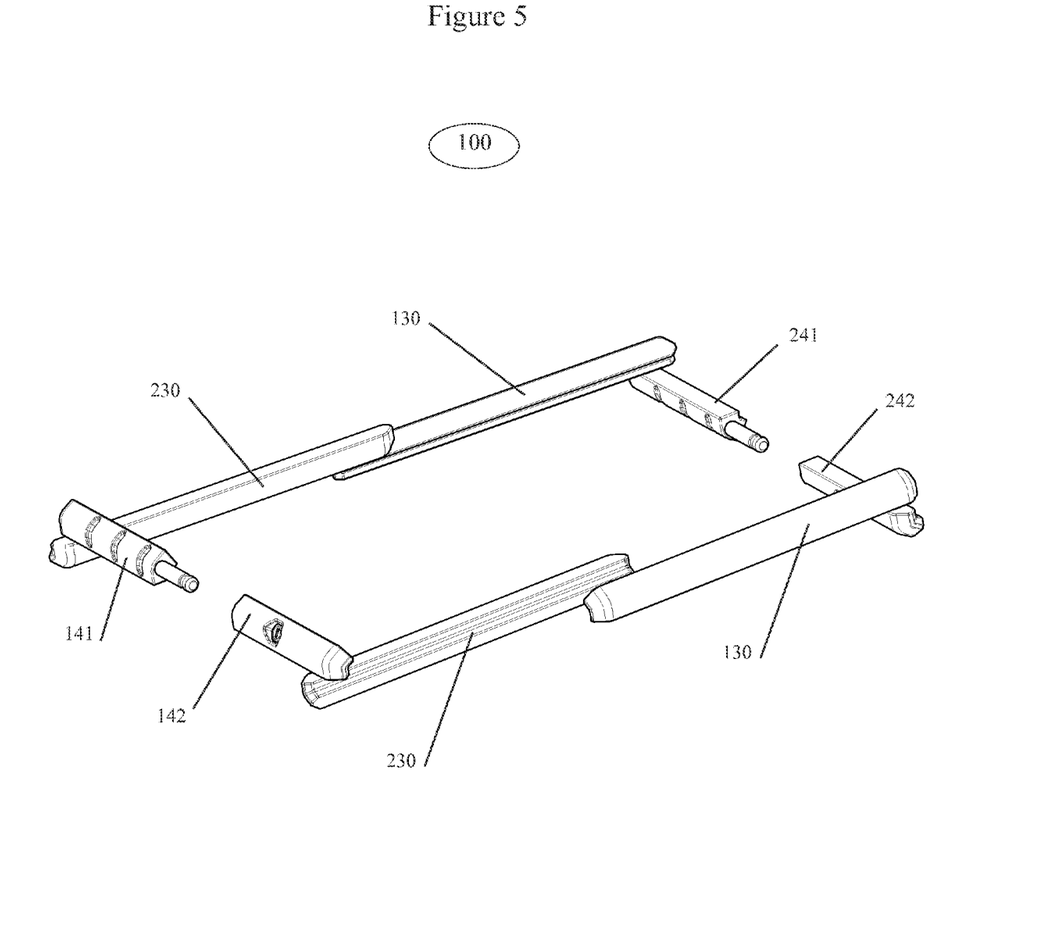
FIG. 5 shows a perspective view of the embodiment of the present disclosure of FIG. 1 in a third configuration.

With reference to FIG. 4, a second separated configuration of the embodiment of the present disclosure is shown wherein right-handed separable link 140 and left-handed separable link 240 have been separated into two complimentary portions. In such a configuration right-handed and left-solid handed links as well as their respective separable links 140 and 240 may be rotated by an operator about respective axes X of rotational couplers 150(a-l). Rotation of links about aforementioned axes allows the device to be configured for instance into a third configuration as shown in FIG. 5.

One of ordinary skill in the art will appreciate that although the embodiment shown in the figures discloses a linkage lock have six links with each link having equal θ values of approximately 60 degrees, that there are embodiments within the scope of the present disclosure with as few as three links and as many as twenty links having corresponding θ values which when the links are configured in a 'closed' orientation approximate a tube.

One of ordinary skill in the art will further appreciate that although the embodiment shown in the figures discloses a linkage lock having two separable links, there are embodiments within the scope of the present disclosure wherein one of the ends achieved by the separable links, namely to allow the links which comprise the linkage lock to be temporarily disconnected from one another may be achieved with the use of other structures for their purpose. For instance, according to an embodiments of the present disclosure not shown in the figures, at least one of the couplers 150(a-1) may be configured to be temporarily separable according to methods known in the arts. According to further embodiments of the present disclosure not shown in the figures, the area of a link where a coupler 150(a-1) is attached may be temporarily separable from the remainder of the link according to methods known in the arts.

Figure 8:
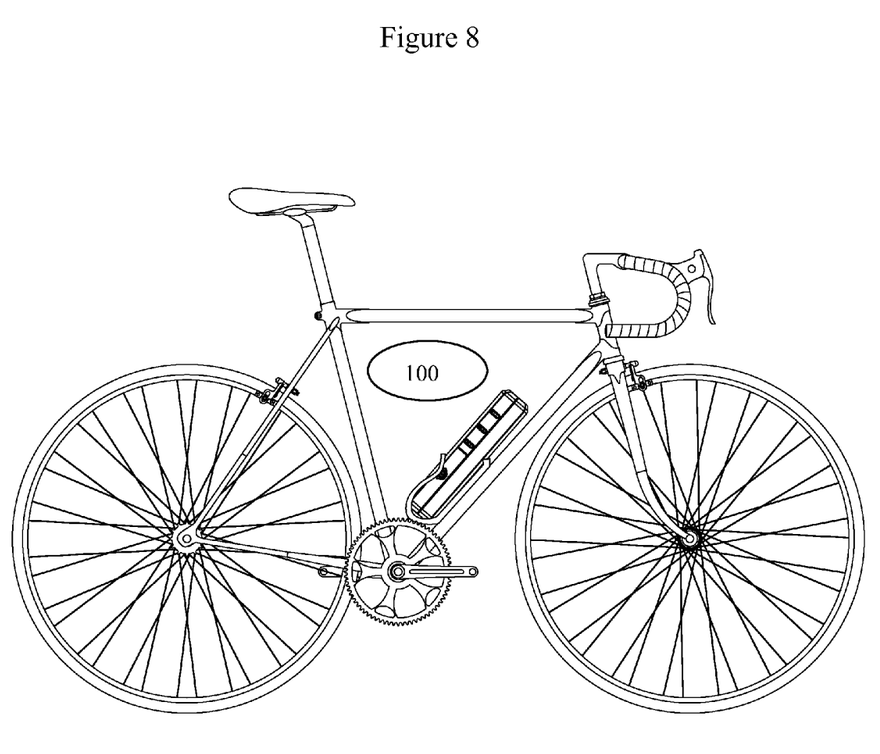
FIG. 8 shows a side view of the embodiment of the present disclosure of FIG. 1 in the first configuration disposed in a bicycle water bottle cage.
Figure 9:
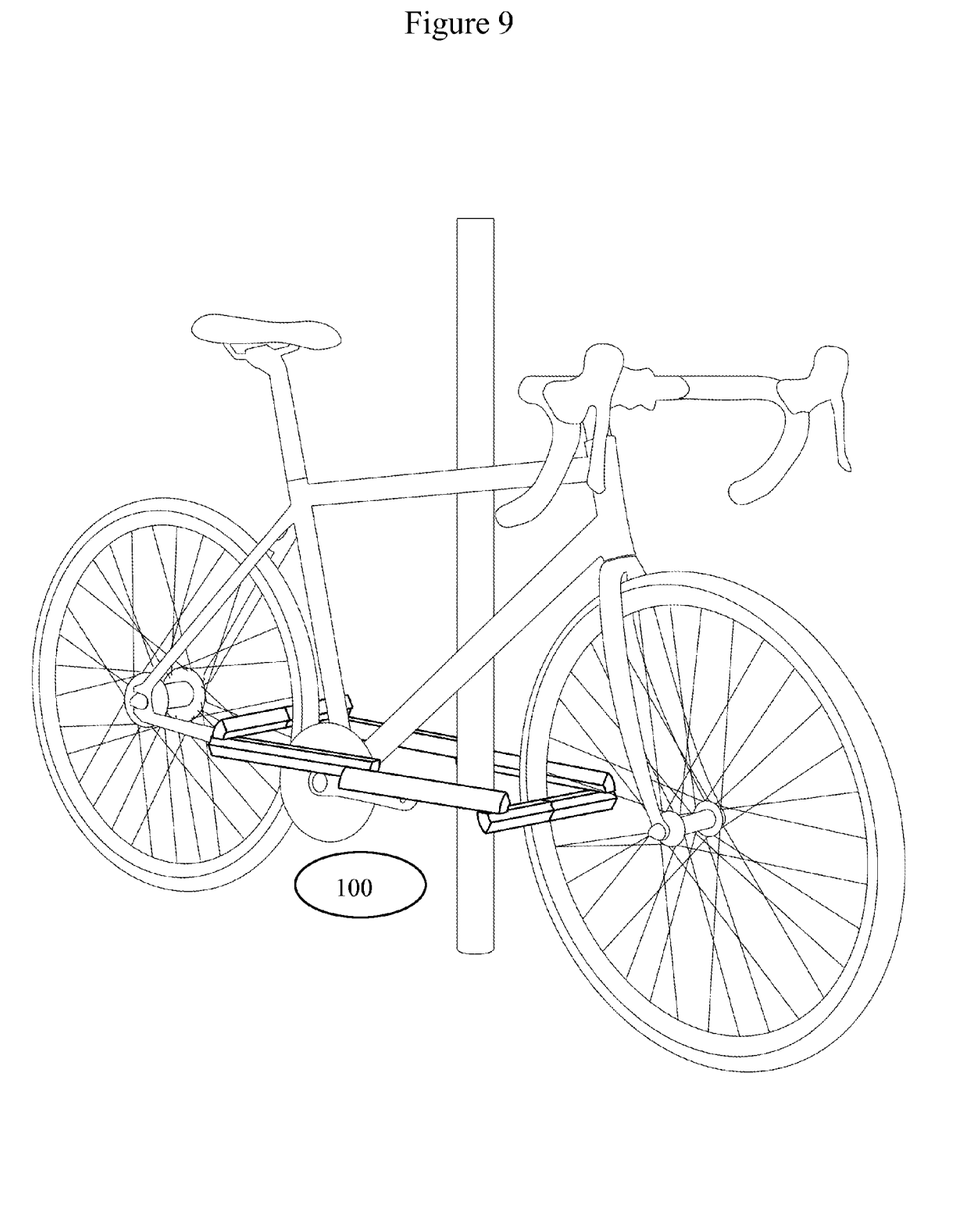
FIG. 9 shows a perspective view of the embodiment of the present disclosure of FIG. 1 in the fourth configuration disposed about the wheels of a bicycle and a post.

One method of using the embodiment of the present disclosure shown in the figures will now be described. Initially, a linkage lock 100 is provided in a 'folded-locked' configuration as shown in FIG. 1. In a 'folded-locked' configuration, the linkage lock may be stored for instance in the bottle cage of a bicycle as shown in FIG. 8 or with troughs 135 and 235 of right-handed links 130(a, b), left-handed solid links 230(a, b), right-handed separable link 140, and left-handed separable link 240 abutting the top tube of a bicycle as shown in FIG. 9. Next, an operator inserts a complimentary key into tumbler 170 disposed within right-handed separable link 140 and rotates said key within tumbler 170 relative to linkage lock 100, thereby disengaging the locking mechanism. This procedure is repeated for similar components disposed within left-handed separable link 240 thereby disengaging the locking mechanisms and configuring the linkage lock in a 'folded-unlocked' configuration.

Figure 6:
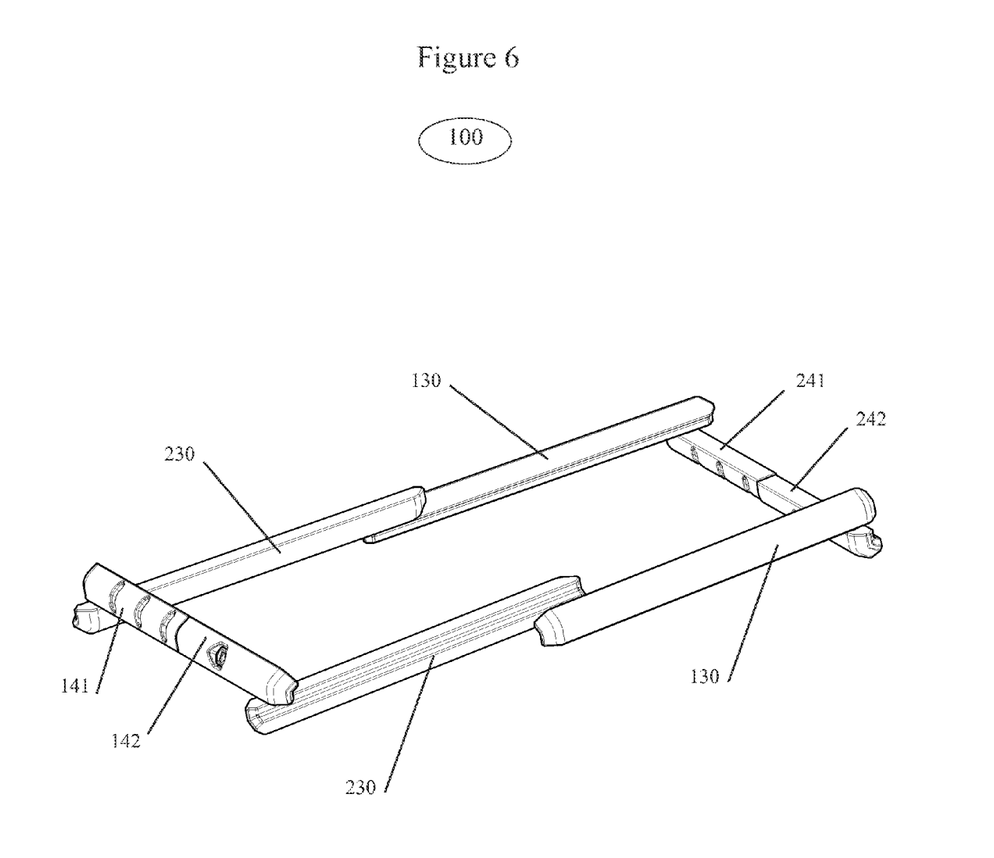
FIG. 6 shows a perspective view of the embodiment of the present disclosure of FIG. 1 in a fourth configuration.
Figure 7:
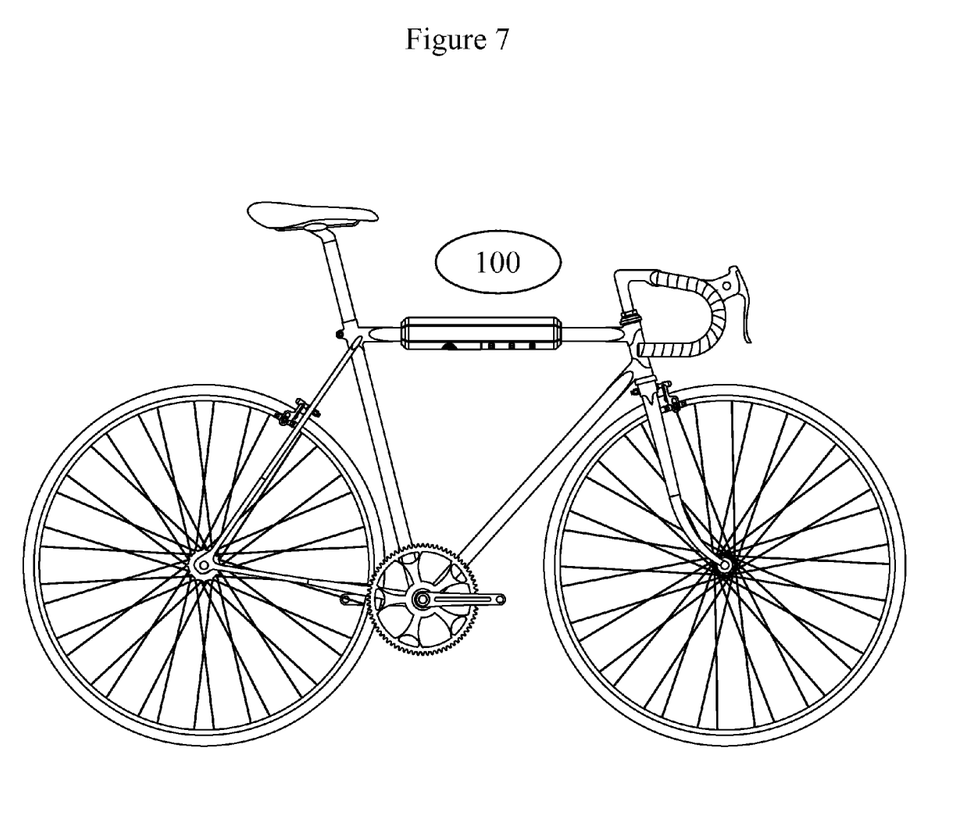
FIG. 7 shows a side view of the embodiment of the present disclosure of FIG. 1 in the first configuration disposed about the top tube of a bicycle.

Next, an operator grasps opposing sides of linkage lock 100 with the female link portion 142 of right-handed separable link 140 and female link 242 of separable link 240 in one hand and male link portion 141 of separable link 140 and male link portion 241 of separable link 240 in the other. Next, the operator applies opposing forces with their hands thereby separating the portions of the linkage lock into an 'unfolded-unlocked' configuration as shown in FIG. 6. When arranged in an 'unfolded-unlocked' configuration, the links which comprise linkage lock 100 may be rotated by an operator relative one another about their respective couplers into configurations which such as that shown in FIGS. 5 and 9. In such configurations, the links of linkage lock are configured to approximate a loop which encloses both the components of an item to be locked, including for instance a bicycle, and a fixed structure to be locked to, including for instance a post as shown in FIG. 9. Upon being suitably configured by an operator, the operator may insert pins 143 and 243 of separable links 140 and 240 into corresponding recesses 144 and 244 of separable links 140 and 240. Upon such insertion, the operator is tactilely notified of positive insertion by the retention of retaining grooves 145 and 245 within respective recesses 144 and 244. Subsequent to such insertion, the operator may then insert the key into tumblers 170 and 270 disposed on separable links 140 240 thereby engaging the locking mechanisms against retaining grooves 145 and 245 thereby temporarily fixing the item to be locked, including for instance a bicycle against a fixed structure, including for instance a post as shown in FIG. 9.

One of ordinary skill in the art will appreciate that in order to disengage the lock, the aforementioned steps may be executed in reverse order.

Figure 10:
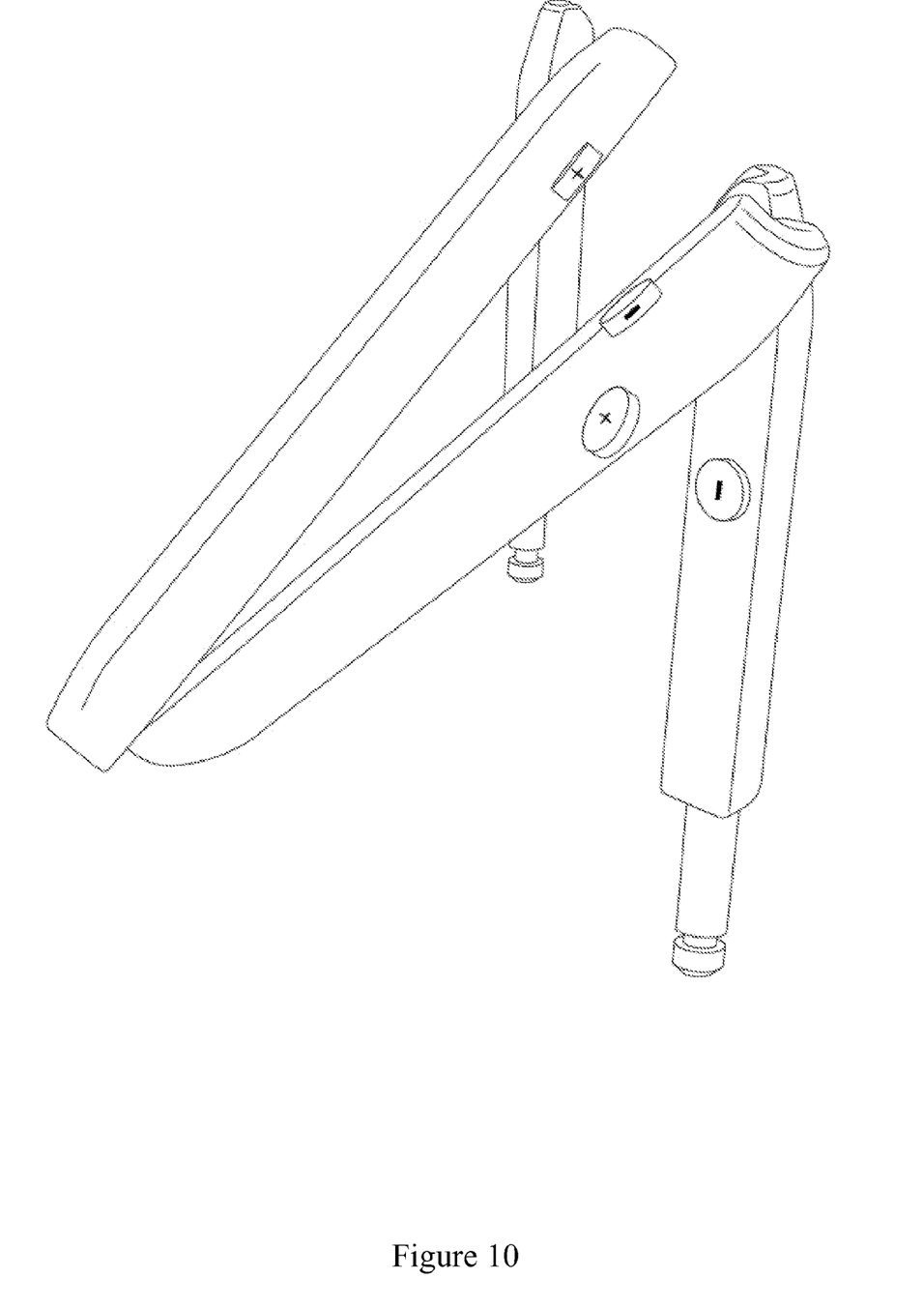
FIG. 10 shows an embodiment of the present disclosure having magnets disposed in the links thereof.

Referring now to FIG. 10, an embodiment of the present disclosure is shown, wherein adjacent link arms of a linkage lock have complementary magnets disposed in the body thereof such that along a given point in the link(s) rotation, including for instance when the device is in a tubular configuration, the magnets urge the links towards a parallel configuration.

Figure 11:
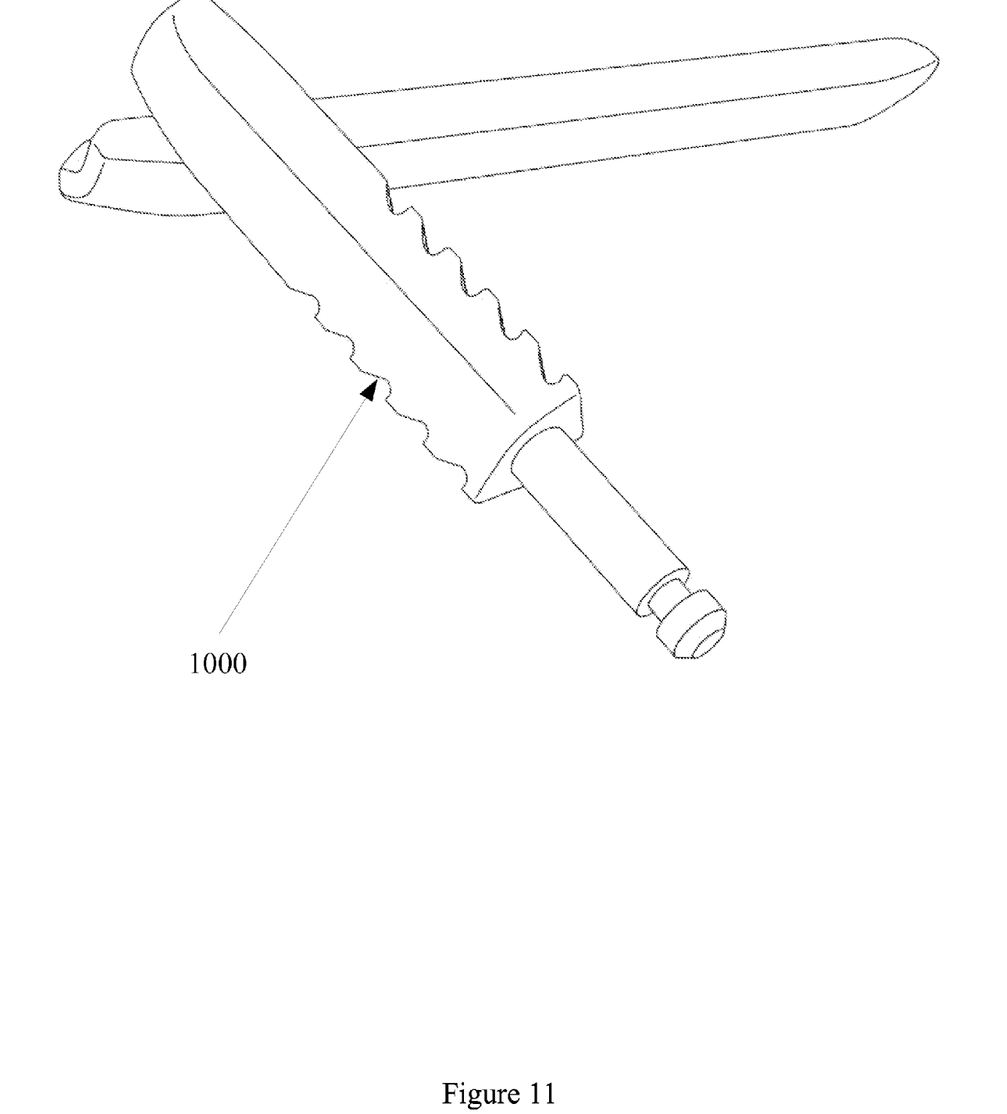
FIG. 11 shows an embodiment of the present disclosure configured to engage spokes of a wheel.

Referring now to FIG. 11, an embodiment of the present disclosure is shown, wherein there is a plurality of hooks 1000 disposed about the periphery of at least one link dimensioned to retain said link against the spoke(s) of a bicycle.

Figure 12:
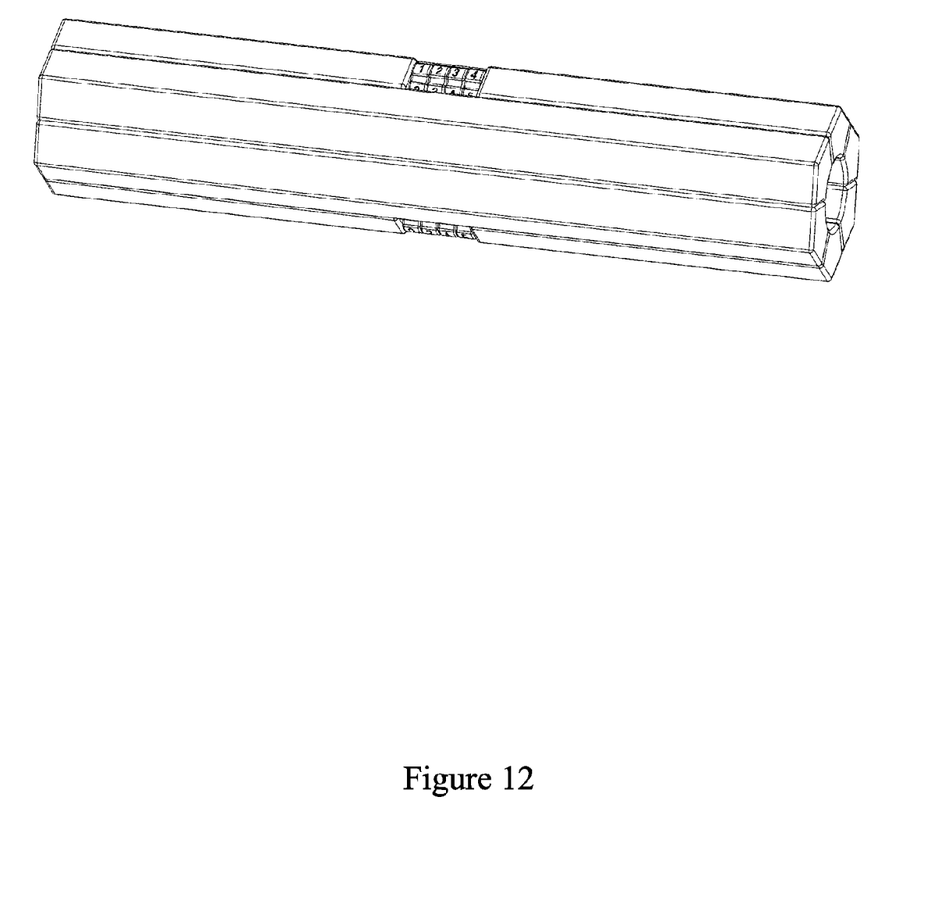
FIG. 12 shows further embodiments of the present disclosure.

Referring now to FIG. 12, further embodiments of the present disclosure are shown wherein a number of methods of coupling links to one another are provided.

Figure 13:
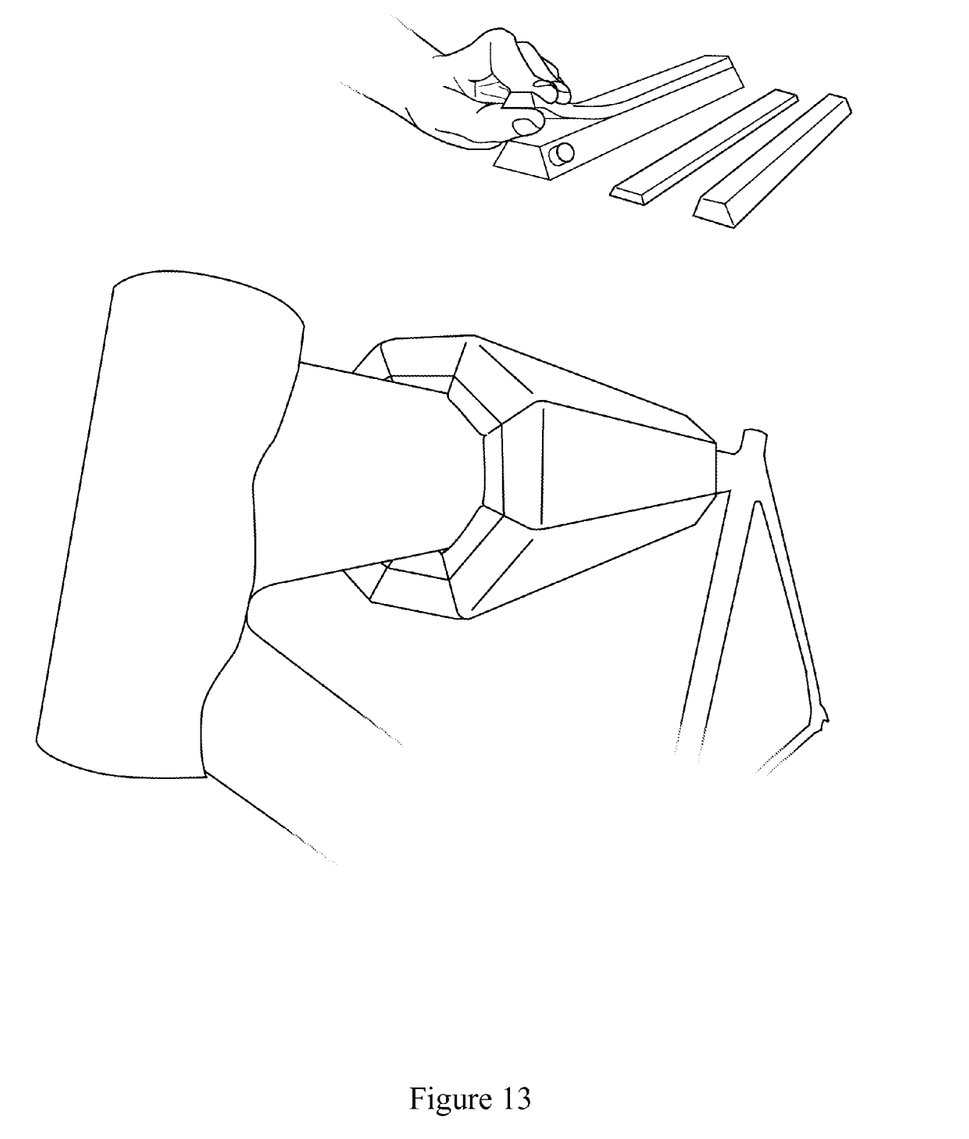
FIG. 13 shows a further embodiment of the present disclosure.

Referring now to FIG. 13, a further embodiment of the present disclosure is shown wherein there is a spacer which may be inserted along the interior face of an assembled linkage lock to accommodate different sizes of tubing on a bicycle frame.

Figure 14:
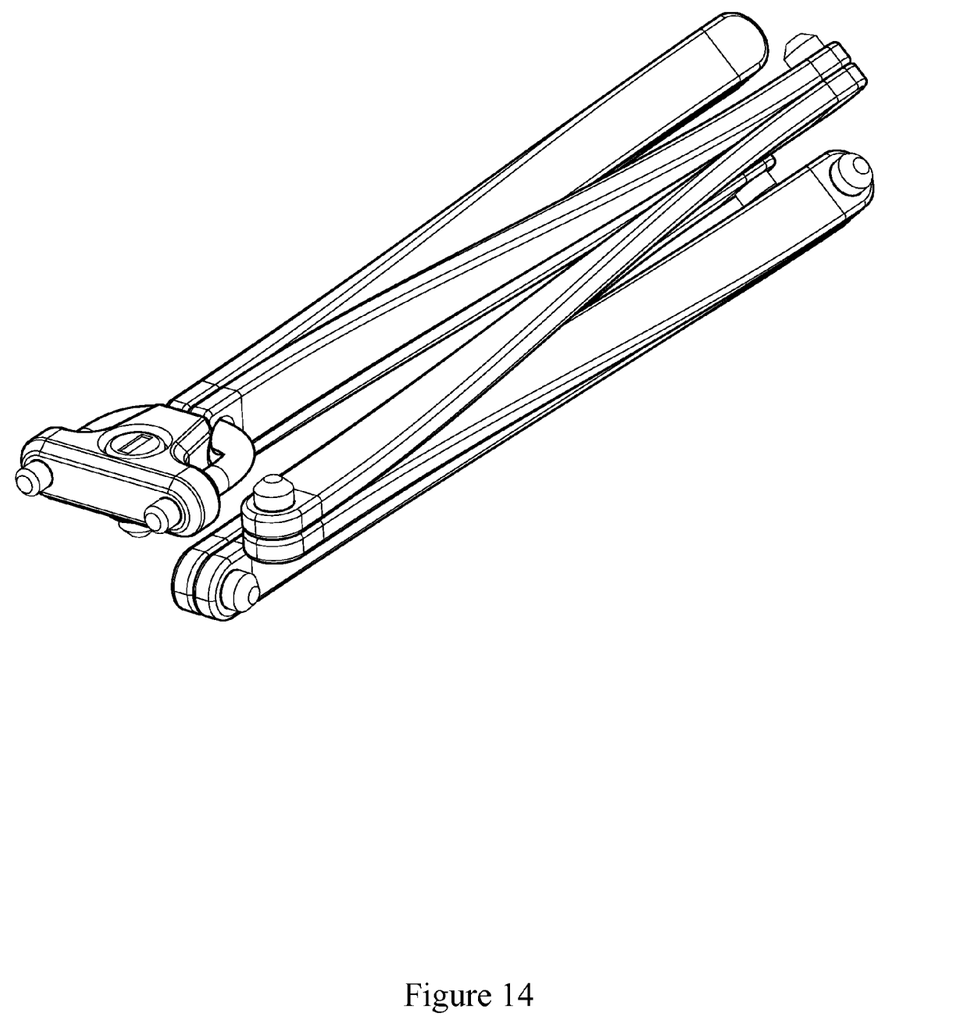
FIG. 14 shows a further embodiment of the present disclosure.

Referring now to FIG. 14, a further embodiment of the present disclosure is shown, wherein consecutive links are deformed axially from one another in a chiral configuration thereby approximating a tube.

Figure 15:
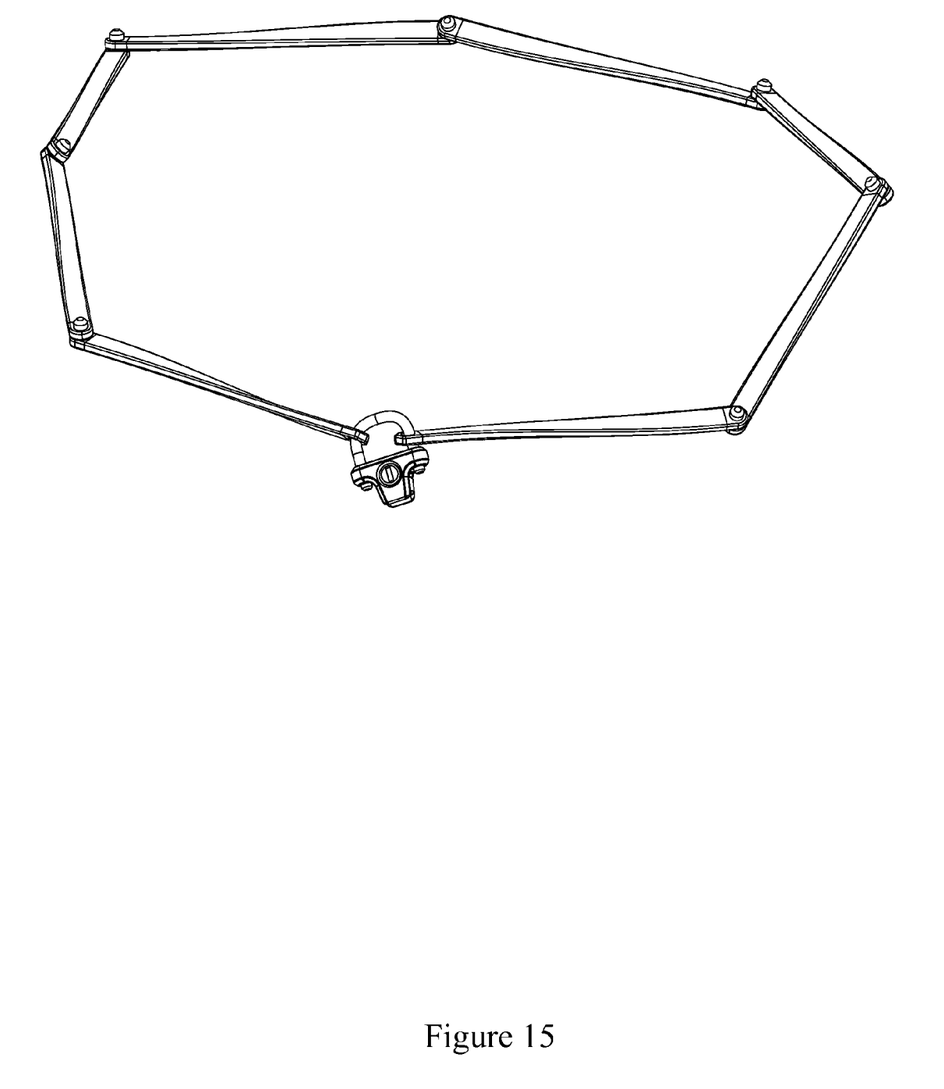
FIG. 15 shows a further embodiment of the present disclosure.

With reference to FIG. 15, an embodiment of the present disclosure is shown, wherein links may be coupled together by means of a shackle lock.

While the invention has been described herein in reference to specific aspects, features and illustrative embodiments of the invention and its method(s) of use, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

I claim:

1. A linkage lock comprising;
   a plurality of elongated links capable of being arranged in a configuration with a substantially annular cross-section thereby approximating a tube whose length is greater than its diameter;
   wherein each link has a longitudinal axis extending therethrough and at least one pivot disposed at the ends thereof configured to allow rotation about an axis in substantially orthogonal relation to the longitudinal axis;
   such that consecutive pivots are oriented at an angle theta relative to one another, and the sum of all of the thetas of all of the pivots which comprise the linkage lock add to 360 degrees;
   wherein at least one link, pivot, or portion thereof is configured to be separable from the remainder of the linkage lock and such separation is mediated by a locking mechanism.

2. The linkage lock of claim 1, wherein the features of the sequential links are substantially chiral reflections of one another.

3. The linkage lock of claim 1, the pivot is selected from at least one of the following, a threaded rod and a complementary threaded recess, a sealed bearing, an open bearing, a post having a complimentary recess, a rivet, a press-fitting, or a snap-fitting.

4. The linkage lock of claim 1, wherein there are mechanical detents in the rotational path of at least one of the pivots.

5. The linkage lock of claim 4, wherein the mechanical detent provides at least one of the following functionalities, is a biasing member disposed within at least one of the pivots which urges its respective link(s) towards a detent, limits rotation, stalls rotation, or providies resistance.

6. The linkage lock of claim 1, wherein the link, pivot, or portion thereof that is separable from the remainder of the linkage lock is configured to pivot away from the remainder of the linkage lock when so separated.

7. The linkage lock of claim 1, where there are two separable links, pivots, or portions thereof which may be separated from the remainder of the assembly by translating such along the longitudinal axis.

8. The linkage lock of claim 1, wherein the locking mechanism is selected from at least one of the following, a keyed tumbler, a combination lock whose combination is encoded by a single disc, a combination lock whose combination is encoded by multiple disks, a combination lock whose combination is encoded by means of a keypad, or an electronic lock.

9. The linkage lock of claim 1, wherein there is a soft or non-marring material disposed upon a portion of the outer surface of the assembled tube.

10. The linkage lock of claim 1, wherein there is a soft or non-marring material disposed upon a portion of the inner surface of the assembled tube.

11. The linkage lock of claim 1, wherein a portion of the exterior of the assembled tube is modified for improved gripping by the hand of a user, said modification may include, but is not limited to a single recess, a pattern of recesses, a single emboss, a pattern of embosses, a portion of material having a greater coefficient of static friction with skin than that of the remainder of the assembly, or a combination thereof.

12. The linkage lock of claim 1, wherein the inner shape of the assembled tube is dimensioned to substantially complementorily engage a tube of a bicycle frame.

13. The linkage lock of claim 1, wherein the outer shape of the assembled tube is dimensioned to substantially complementorily engage a bicycle water-bottle cage.

14. The linkage lock of claim 1, where, the links are composed of a rigid material selected from at least one of wood, metal, natural polymers, synthetic polymers.

15. The linkage lock of claim 1, wherein the total number of links is within the range of 4 to 10.

16. The linkage lock of claim 1, wherein there are complementary magnets disposed within adjacent links configured to provide a temporary fixation thereof along a given point in the rotational path of said links.

17. The linkage lock of claim 1, wherein the length of one or more pivot is adjustable thereby defining a range of inner diameters of the tube.

18. The linkage lock of claim 1, wherein the at least one of the links may be temporarily separated along its longitudinal axis.

19. The linkage lock of claim 1, wherein the exterior of at least one of the links has portions removed therefrom configured to temporarily engage the spokes of a bicycle.

20. The linkage lock of claim 1, wherein two of the links may be disconnected from the remainder of the assembled linkage lock, thereby defining two distinct parts.

* * * * *